… (III)United States Patent Office
3,184,470
Patented May 18, 1965

3,184,470
NEW TRIAZOLIDINES
Heinrich Ruschig, Bad Soden, Taunus, Karl Schmitt, Gerd Driesen, and Leopold Ther, Frankfurt am Main, and Werner Pfaff, Hofheim-Marxheim, Taunus, Germany, assignors to Farbwerke Hoechst Aktiengesellschaft vormals Meister Lucius & Brüning, Frankfurt am Main, Germany, a corporation of Germany
No Drawing. Filed July 13, 1961, Ser. No. 124,815
Claims priority, application Germany, July 20, 1960, F 31,700
6 Claims. (Cl. 260—308)

The present invention relates to new, therapeutically active triazolidines, and to their salts, of the Formula I

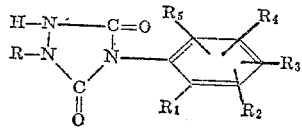

(I)

in which R represents a phenyl group in which 1 or 2 hydrogen atoms may be substituted by a halogen atom or a methyl or methoxy group, $R_1$ represents a halogen atom, an alkyl or alkoxy group having 1 to 4 carbon atoms, or a phenoxy- or benzyl group, $R_2$ represents a halogen atom, an alkyl or alkoxy group having 1 to 8 carbon atoms, a hydroxyethoxy group, a cycloalkyl group, a phenyl group, a p-ethoxy-phenyl group having 5 to 6 carbon atoms, a benzyl group, a benzhydryl group, a benzyloxy group, a m-methoxybenzyl group, an aryloxy or arylmercapto group, an aryloxy or arylmercapto group, $R_3$ represents hydrogen, a halogen atom, a trifluoromethyl group, an alkyl or alkoxy group having 1 to 4 carbon atoms, a halogenoalkoxy or alkoxyalkyl group having up to 4 carbon atoms, a nitro group, an acetyl group, a methylsulfonyl, ethylsulfonyl or arylsulfonyl group, $R_4$ represents hydrogen, a methyl, methoxy or ethoxy group, and $R_5$ represents hydrogen, a methyl or acetyl group; it may also be that two adjacent residues $R_2$, $R_3$, $R_4$ and $R_5$ are members of a methylenedioxy or a benzofuran ring.

The present invention also provides for the manufacture of the triazolidines of the above formula by methods generally known for the preparation of such triazolidines, i.e., (a) By treating reactive derivatives of semicarbazide-carboxylic acids of the general Formulae II and IIa

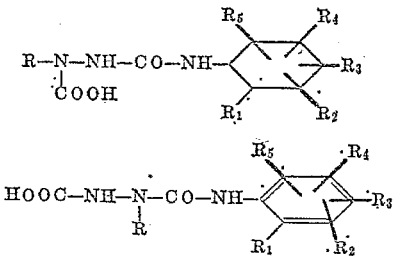

with alkaline agents or by heating them in the absence of alkaline agents, or (b) By reacting semicarbazides of the Formulae III and IIIa

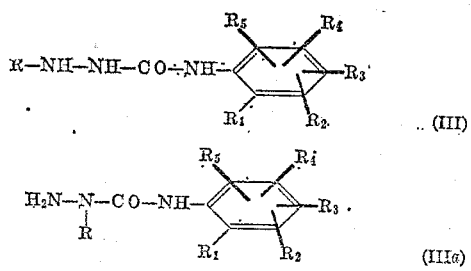

with reactive derivatives of carbonic acid, or (c) By reactive derivatives of phenylhydrazine-$N^1,N^2$-dicarboxylic acids of the Formula IV

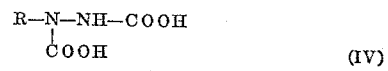

(IV)

with amines of the Formula V

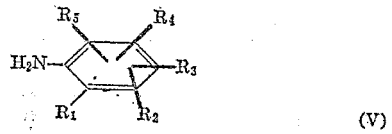

(V)

or (d) By reacting reactive derivatives of phenylhydrazine-$N^1$- or $N^2$-monocarboxylic acids of the Formulae VI and VIa

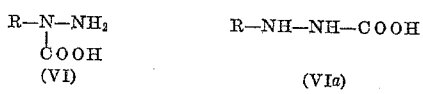

with reactive N-carboxylic acid derivatives of amines of the Formula V, or (e) By reacting phenylhydrazine of the Formula R—NH—NH$_2$ with amines of the Formula V in the presence of reactive derivatives of carbonic acid, or (f) By replacing the sulfur atom in thiotriazolidines of the general Formula VII

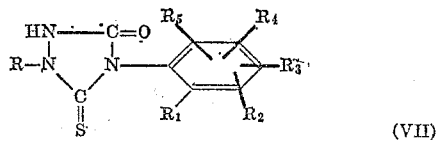

(VII)

by an oxygen atom, or (g) By reacting triazolidines of the general Formula

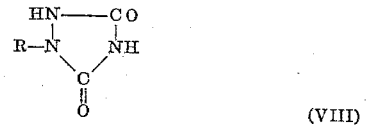

(VIII)

with amines of the Formula V, or (h) By reacting oxadiazolone derivatives of the general Formula IX

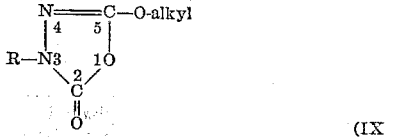

(IX with amines of the Formula V, or (i) By reacting phenylhydrazines of the formula R—NH—NH₂ with reactive derivatives of aniline-N,N-dicarboxylic acids of the Formula X

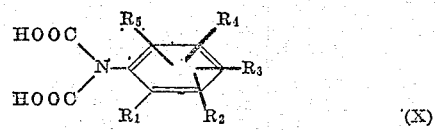

and, if desired or required, converting the compounds so obtained into the corresponding salts by treatment with inorganic or organic bases.

The substituents in the general Formula I may have the following meanings:

R: phenyl, 2-methyl-phenyl, 4-methoxy-phenyl, 3,5-dimethoxy-phenyl, 2,4-dimethyl-phenyl, 4-chloro-phenyl, 2-chloro-4-methoxy-phenyl.

$R_1$: fluorine, chlorine, bromine, iodine, methoxy, ethoxy, isopropoxy, n-butoxy, sec.butoxy, methyl, ethyl, propyl, isopropyl, n-butyl, isobutyl, sec.butyl, benzyloxy, phenoxy, tolyloxy, p-methoxy-phenoxy, m-chloro-phenoxy.

$R_2$: chlorine, bromine, methyl, ethyl, isopropyl, tert.butyl, n-hexyl, 2,4,6-trimethyl-pentyl-(2), cyclopentyl, cyclohexyl, benzyl, m-methoxy-benzyl, benzhydryl, phenyl, p-ethoxy-phenyl, methoxy-, propoxy, sec.butoxy, n-hexyloxy, β-hydroxy-ethoxy-, β-chloro-ethoxy, benzyloxy, m-methoxy-benzyloxy-phenoxy, o-, m- or p-tolyloxy, p-butoxy-phenoxy, phenylmercapto.

$R_3$: fluorine, chlorine, bromine, iodine, trifluoromethyl, methyl, ethyl, propyl, butyl, isobutyl, sec.butyl, tert.butyl, methoxy, β-hydroxy-ethoxy, β-ethoxy-ethoxy, β-chloro-ethoxy, isopropoxy, n-butoxy, sec.butoxy, nitro, acetyl, ethylsulfonyl, β-hydroxy-ethylsulfonyl, phenylsulfonyl, p - ethoxy-phenyl-sulfonyl, o-chloro-phenylsulfonyl, o-, m- or p-tolylsulfonyl.

$R_4$ and $R_5$: methyl, methoxy and ethoxy.

In particular, there enter into consideration compounds in the formulae of which R represents the phenyl radical and the substituent of the following formula

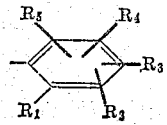

represents a phenyl radical substituted in 2-position by a halogen atom, an alkyl or alkoxy group having 1 to 4 carbon atoms and further substituted in 4-position by a phenoxy group, a cyclohexyl group or an alkyl or alkoxy group having 1 to 4 carbon atoms; further substituting in 5-position by an alkyl or alkoxy group having 1 to 4 carbon atoms or by a halogen atom may be of advantage.

The following semicarbazide derivatives which correspond to the Formulae II and IIa may be used as starting substances for the process of the present invention in the the form of reactive derivatives are mentioned by way of example:

1- or 2-phenyl-4-(2-chloro- or methyl-4-methoxy- or ethoxy-phenyl)-semicarbazide-carboxylic acid-(1), 1- or 2-phenyl-4-(2,4,6-trimethyl-phenyl)semicarbazide-carboxylic acid-(1), 1- or 2-phenyl-4-(2,4-dimethoxy-5-isopropyl-phenyl)-semicarbazide-carboxylic acid-(1), 1- or 2-phenyl-4-(2-methoxy- or 2-methyl- or 2,5-dimethoxy-4-phenoxy-phenyl)-semicarbazide-carboxylic acid-(1), 1- or 2-phenyl-4-(2,5-dimethyl-4 - phenoxy-phenyl) - semicarbazide-carboxylic acid-(1), 1- or 2-phenyl-4-[3-methoxy-diphenyleneoxide-(2)]-semicarbazide-carboxylic acid-(1).

As starting substances which correspond to the indicated Formulae III and IIIa, there may be used the semicarbazides from which the above-mentioned semicarbazide-carboxylic acids are derived.

As reactive $N^1,N^2$-dicarboxylic acid derivatives of phenylhydrazines of the Formula IV, which can be converted into 3,5-dioxo-1,2,4-triazolidines by reaction with amines of the Formula V, there are suitable, for example, their esters, halides or amides.

As reactive $N^1$- or $N^2$-monocarboxylic acid derivatives of phenylhydrazines (cf. Formulae VI and VIa) which can be converted into 3,5-dioxo-1,2,4-triazolidines by reaction with reactive N-carboxylic acid derivatives of amines of the Formula V, there enter into consideration, for example, the esters, amides or halides. Under the designation "reactive N-carboxylic acid derivatives of amines" there are to be understood, for example, corresponding phenyl ureas, phenylcarbamic acid esters, or phenylcarbamic acid halides or phenylisocyanates.

The compounds corresponding to the Formulae VII, VIII, IX and X, which may also be used as starting substances, are likewise derived from amines of the Formula V and/or from the phenylhydrazines contained in the afore-mentioned semicarbazide-carboxylic acids.

If compounds of the Formulae II or IIa are used as starting substances in the process of the present invention, it is of advantage to use them in the form of their functional reactive derivatives, preferably in the form of their esters with low molecular alcohols or with phenols. The process of the present invention can be varied within wide limits and may be adapted to any conditions required. Thus, it may sometimes be suitable to carry out the reaction in the presence of alkaline agents, for example, alkali- or alkaline earth metals, -hydroxides, -carbonates, -alcoholates, -hydrides or -amides.

The cyclization reaction described under (a) to yield 3,5-dioxo-1,2,4-triazolidine derivatives is effected advantageously by a treatment with alkaline agents; the reaction may be carried out in the presence of water or in the presence of organic solvents, in particular of alcohols, for example, methanol or ethanol, or of dialkylformamides such as dimethylformamide. As alkaline agents there are suitable in particular alkali metal hydroxides, alkaline earth metal hydroxides or alkali metal alcoholates; however, other basic agents such as alkali metal or alkaline earth metal carbonates, ammoniac or organic bases may also be used. In some cases, the ring closure takes place already at room temperature, but in general it is advantageous to use elevated temperatures in order to attain sufficient reaction speeds. Operation at the boiling temperature of the solvent used is preferred. The 3,5-dioxo-1,2,4-triazolidines formed by the reaction have an acid reaction and, owing to the alkaline reaction medium, they are recovered in the form of salts. For processing, it is therefore advantageous to convert them into the free compounds by treatment with organic or inorganic acids and to purify them by recrystallization or precipitation from an alkaline solution. Cyclization may also be effected without alkaline agents; in this case it is necessary to use elevated temperatures, for example, temperatures of over 80° C., in many cases also of over 150 C. The reaction is then suitably carried out without any solvents and the products are purified by dissolving them in alkali which allows of separating the neutral by-products that have formed.

The starting substances of the Formulae II and IIa or their reactive derivatives can be obtained by known methods, for example, from corresponding phenylhydrazine-$N^1,N^2$-dicarboxylic acid derivatives such as phenylhydrazine-N-carboxylic acid ester-N'-carboxylic acid halides, by reaction with corresponding aniline derivatives, or from corresponding phenylhydrazine-monocarboxylic acid derivatives by reaction with correspondingly substituted phenylisocyanates. In general, it is not necessary to isolate the mentioned semicarbazide-carboxylic acid derivatives or to purify them. They may be reacted in the reaction mixture in which they are formed or as crude products directly by treatment with alkali or by heating, to yield the desired 3,5-dioxo - 1,2,4 - triazolidines. Both methods of operation may, of course, be combined; thus, it is possible first to heat the semicarbazide-carboxylic acid derivative in the absence of alkaline agents and then to treat it with alkaline agents.

The conversion of the starting substances of the Formulae III and IIIa into the desired 3,5-dioxo-1,2,4-triazolidines is similar to the reaction described above. This conversion, too, is carried out according to the methods generally used for the preparation of triazolidines. For example, the reaction may be effected in the presence or in the absence of a solvent, the reaction temperature depending on the reactivity of the carbonic acid derivative used. As solvents or as distributing agents, there may be mentioned by way of example, aromatic hydrocarbons such as benzene, toluene, and xylene. When, for example, phosgene is used as a carbonic acid derivative, the triazolidine ring closure can be brought about by heating in benzene/toluene, whereas when urea is used as a reaction component, it is advantageous to operate in the melt at temperatures of above 150° C.

Similar reaction conditions are necessary for carrying out the other methods of the process of the present invention, namely for the reaction of corresponding phenylhydrazine-$N^1,N^2$-dicarboxylic acid derivatives of the Formula IV, for example, their halides or esters with low molecular alcohols or with phenols, or their amides, with amines of the Formula V, the use of the latter in the form of mineral acidic salts also being possible, or the reaction of reactive derivatives of phenylhydrazines-$N^1$- or $N^2$-monocarboxylic acids of the Formulae VI and VIa with reactive N-carboxylic acid derivatives of amines of the Formula V. As such compounds there enter into consideration, for example, phenylureas, phenylisocyanates, phenylcarbamic acid esters or phenylcarbamic acid chloride. Phenylhydrazines of the Formula R—NH—$NH_2$ react under similar conditions with amines of the Formula V, the use of the corresponding salts with inorganic or organic acids also being possible. As a reactive carbonic acid derivative, urea is particularly suitable.

The optimum reaction temperature are in the range of 180 and 220° C.

The triazolidines of the Formula VIII substituted in 1-position as well as the oxadiazolone derivatives of the Formula IX can be reacted with the corresponding amines under similar reaction conditions.

As reactive derivatives of aniline-N,N-dicarboxylic acids of the indicated Formula X, which may be converted into triazolidines of the Formula I by reaction with phenylhydrazines of the formula R—NH—$NH_2$, the enter into consideration preferably the esters of low molecular alcohols, but there may also be used, for example, phenol esters, ester amides or diamides. The reaction is advantageously carried out in the presence of a suitable solvent such as dioxane, benzene, toluene or xylene and with the use of an alkaline agent, but it is also possible to operate without solvent. As alkaline agents there are suitable, for example, alkali- or alkaline earth-metals, -hydroxides, -carbonates, -alcoholates, -hydrides or -amines, which may be used in catalytical, equivalent or in excess quantities.

It is advantageous to liberate the reaction products from neutral by-products or unreacted starting material preferably by treating the reaction mixture with aqueous or aqueous/alcoholic alkali in which the 3,5-dioxo-1,2,4-triazolidines are in most cases easily soluble; thereby the ring closure is sometimes completed. From the alkaline solution the free 3,5-dioxo-1,2,4-triazolidines are obtained, generally in the form of crystals by acidification with inorganic or organic acids. The compounds can be purified in the usual manner by recrystallization from a suitable solvent.

The reaction by which the sulfur atom in thiotriazolidines of the Formula VII is replaced by an oxygen atom is likewise a reaction generally known in the application to other substances. For carrying out this reaction, it is preferred to use an oxidizing agent, preferably potassium permanganate, which acts rapidly in the cold on a thiotriazolidine dissolved in aqueous alkali. The reaction is advantageously completed by moderate heating and the reaction solution is processed in the usual manner after having been suction-filtered to remove the manganese dioxide formed. The sulfur may also be replaced by oxygen with the aid of a heavy metal oxide, for example, mercuric oxide; in this case the operation is advantageously effected in an inert organic solvent such as benzene, toluene, cumene or cymene, and at temperatures of over 100° C., preferably about 150° C.; if required, the reaction must be carried out in a pressure vessel.

The 3,5-dioxo-1,2,4-triazolidines obtained by the process of the present invention are compounds of an acidic nature, which may be converted into the corresponding salts in the usual manner by treatment with mineral or organic bases. As inorganic bases, there may be mentioned by way of example alkali metal or alkaline earth metal hydroxides, preferably sodium hydroxide, magnesium hydroxide, and calcium hydroxide. As organic bases there are suitable in particular amines substituted by aliphatic residues, for example, $\beta$-dimethyl-aminoethanol, $\beta$-diethylaminoethanol, diethanolamine, triethanolamine, diethanol-methylamine, etc. With regard to their intended use as medicaments, the corresponding alkali metal salts and alkaline earth metal salts which in most cases are soluble in water and whose solutions show a physiological pH-value, are of particular importance.

The products of the present invention are valuable medicaments and they possess, in particular, blood pressure lowering properties; but they also exhibit antiphlogistic, analgesic and vasodilatatory action (on the coronary vessels) and are generally distinguished by a good physiological tolerability. For example, the sodium salt of 1-phenyl-(2,4-dimethoxy-5-isopropyl-phenyl) - 3,5 - dioxo - 1,2,4-triazolidine, intravenously administered to a narcotized cat in a dose of 5–10 mg./kg., reduces the blood pressure by 60 to 80 mm. Hg., depending on the initial blood pressure. This reduction in the blood pressure persists for some hours. Subcutaneous (10 mg./kg.) and oral administration also cause a long-lasting reduction of the blood pressure. In a narcotized rabbit, 2 mg./kg. of the compound, intravenously administered, cause a reduction of the blood pressure by at least 20 mm. Hg. which persists for several hours. Intravenous administration of 10 mg. of the compound per day to a rabbit over 4 weeks was well tolerated. No accustoming was observed; a measurement of the blood pressure at the end of the 4 week period, after intravenous administration of 10 mg./kg., showed a reduction of the blood pressure by 60 mm. Hg which persisted several hours. The intravenous administration to a white mouse revealed a $DL_{50}$ of 500 mg./kg. Hence, the compound has an unexpected, broad therapeutic activity.

The products of the present invention may be used as such or in the form of their corresponding salts, if required, in admixture with pharmaceutically usual auxiliary agents and carriers; they may be applied orally or parenterally. For oral administration, the preparations are used preferably in the form of tablets or dragees in which the products of the present invention are contained as the active ingredients together with the usual carriers, for example lactose, starch, tragacanth, and magnesium stearate. To humans, 5 to 100 mg. of the compounds per dose are applied. The novel compounds or their salts are preferably orally administered.

The following examples illustrate the invention but they are not intended to limit it thereto:

EXAMPLE 1

*1-phenyl-4-(2,4,5-trimethyl-phenyl)-3,5-dioxo-1,2,4-triazolidine*

A solution of 19 g. of 2,4,5-trimethylaniline and 17 g. of N,N-dimethylaniline in 50 cc. of ethanol was added to a solution of 34 g. of phenylhydrazine-β-carboxylic acid-ethyl ester-α-carboxylic acid chloride in 150 cc. of ethanol, and by heating for 1 hour to 50–60° C., the mixture was caused to react and to form 2-phenyl-4-(2,4-trimethyl-phenyl)-semicarbazide-carboxylic acid-(1)-ethyl ester. This product was then condensed without previous isolation by addition of 200 cc. of 2 N-sodium hydroxide solution and heating for 2 hours to 50 to 80° C. to yield the corresponding triazolidine derivative. The reaction solution was diluted with water and clarified by shaking with ether and filtration with charcoal, the triazolidine was precipitated by acidification with hydrochloric acid. The product was then filtered with suction, washed with water, and dried. The yield was 37.5 g., the melting point of the compound after recrystallization from ethanol was at 205 to 206° C.

The sodium salt was obtained by dissolving the triazolidine in ethyl acetate and adding the calculated quantity of a methanolic sodium methylate solution, and after having suction-filtered with charcoal, by adding ether to the solution until crystallization started. The following triazolidines were prepared according to the above method with the use of correspondingly substituted anilines and converted into the sodium salts either by treatment with the calculated quantity of sodium methylate or by treatment with sodium hydroxide solution:

1-phenyl - 4 - (2-chloro - 4 - methyl-phenyl)-3,5-dioxo-1,2,4-triazolidine. Melting point 163–165° C. (from ethanol).

1-phenyl - 4 - (2-n-propyl-4,5-methylenedioxy-phenyl)-3,5-dioxo-1,2,4-triazolidine. Melting point 160–162° C. (from ethylacetate/petroleum ether).

1-phenyl - 4 - (2-chloro - 4,5 - dimethyl-phenyl)-3,5-dioxo-1,2,4-triazolidine. Melting point 198–199° C. (from alcohol).

1-phenyl - 4 - (2-methyl-4-n-butoxy-phenyl)-3,5-dioxo-1,2,4-triazolidine. Melting point 175–176° C. (from alcohol).

1-phenyl - 4 - (2,4-dimethyl-5-nitro-phenyl)-3,5-dioxo-1,2,4-triazolidine. Melting point 237–239° C. (from alcohol).

1-phenyl-4-(2,4-dichloro-5-methyl - phenyl)-3,5-dioxo-1,2,4-triazolidine. Melting point 220–222° C. (from alcohol).

1-phenyl - 4 - (4,5-dichloro-2-methyl-phenyl)-3,5-dioxo-1,2,4-triazolidine. Melting point 218–220° C. (from alcohol).

1-phenyl - 4 - (2 - methyl-4-cyclohexyl-phenyl)-3,5-dioxo-1,2,4-triazolidine. Melting point 215–217° C. (from alcohol).

1-phenyl - 4 - (2,5-dichloro-4-isopropyl-phenyl)-3,5-dioxo-1,2,4-triazolidine. Melting point 211–213° C. (from alcohol).

1-phenyl - 4 - (2,5-diethoxy-phenyl) - 3,5 - dioxo-1,2,4-triazolidine. Melting point 124–126° C. (from aqueous alcohol).

1-phenyl - 4 - (2,5-dimethoxy-4-chloro-phenyl)-3,5-dioxo-1,2,4-triazolidine. Melting point 237–238° C. (from dimethylformamide/water).

1-phenyl - 4 - (2-methyl-4-methoxy-phenyl)3,5-dioxo-1,2,4-triazolidine. Melting point 173–174° C. (from alcohol).

1-phenyl - 4 - (2-methoxy-5-methyl-phenyl)-3,5-dioxo-1,2,4-triazolidine. Melting point 184–186° C. (from alcohol).

1-phenyl - 4 - (2-methoxy-4-chloro-5-methyl-phenyl)-3,5-dioxo-1,2,4-triazolidine. Melting point 188–189° C. (from alcohol).

1-phenyl - 4 - (2-methoxy-4,5-dimethyl-phenyl)-3,5-dioxo-1,2,4-triazolidine. Melting point 200–203° C. (from alcohol).

1-phenyl - 4 - (2,4-dimethoxy-5-isopropyl-phenyl)-3,5-dioxo-1,2,4-triazolidine. Melting point 205–206° C. (from alcohol).

1-phenyl - 4 - (2-methyl-4-phenoxy-phenyl)-3,5-dioxo-1,2,4-triazolidine. Melting point 167–168° C. (from alcohol).

1-phenyl - 4 - (2,4,6-trimethyl-3,5-diacetyl-phenyl)-3,5-dioxo-1,2,4-triazolidine. Melting point 205–206° C. (from alcohol).

1-phenyl - 4 - (2-methyl-4-benzhydryl - phenyl)-3,5-dioxo-1,2,4-triazolidine. Melting point 205–207° C. (from alcohol).

1-phenyl - 4 - (2,6-dimethyl-4-cyclohexyl-phenyl)-3,5-dioxo-1,2,4-triazolidine. Melting point 213–215° C. (from alcohol).

1-phenyl - 4 - (2 - methyl-4-methoxy-5-tert.butyl-phenyl)-3,5-dioxo-1,2,4-triazolidine. Melting point 254–256° C. (from alcohol).

1-phenyl - 4 - (2,5-dimethyl-phenyl) - 3,5 - dioxo-1,2,4-triazolidine. Melting point 198–199° C. (from alcohol).

1-phenyl - 4 - (2-methyl-5-methoxy-phenyl)-3,5-dioxo-1,2,4-triazolidine. Melting point 175–176° C. (from alcohol).

1-phenyl - 4 - (2,5-diethoxy-4-chloro-phenyl)-3,5-dioxo-1,2,4-triazolidine. Melting point 169–170° C. (from ethyl acetate/petroleum ether).

1-phenyl - 4 - (2,5-dimethoxy-4-phenoxy-phenyl)-3,5-dioxo-1,2,4-triazolidine. Melting point 210–212° C. (from alcohol).

3-[1-phenyl - 3,5 - dioxo - 1,2,4 - triazolidyl-(4)]-4-methoxy-diphenylsulfone. Melting point 208–210° C.

1-phenyl - 4 - (2-chloro - 4 - ethoxy-phenyl)-3,5-dioxo-1,2,4-triazolidine. Melting point 133–135° C. (from alcohol).

1-phenyl - 4 - (2,5-dimethoxy-3,4-dimethyl-phenyl)-3,5-dioxo-1,2,4-triazolidine. Melting point 197–199° C. (from alcohol).

1-phenyl-4-(2 - benzyloxy-5-methyl-phenyl)-3,5-dioxo-1,2,4-triazolidine. Melting point 152–153° C. (from acetone/petroleum ether).

1-phenyl - 4 - (2-methoxy-4-phenylmercapto-phenyl)-3,5-dioxo-1,2,4-triazolidine. Melting point 158–160° C. (from ethanol).

1-phenyl - 4 - (2-chloro - 4 - isopropoxy-phenyl)-3,5-dioxo-1,2,4-triazolidine. Melting point 183–185° C. (from ethanol).

1-phenyl - 4 - (2-phenyloxy-4-methoxy-phenyl)-3,5-dioxo-1,2,4-triazolidine. Melting point 182–184° C. (from ethanol).

1-phenyl - 4 - (2,4-diphenoxy-phenyl)-3,5-dioxo-1,2,5-triazolidine. Melting point 162–163° C. (from methanol).

1-phenyl - 4 - (2,4-dimethyl-4-iodo-phenyl)-3,5-dioxo-1,2,4-triazolidine. Melting point 208–210° C. (from ethanol).

1-phenyl - 4 - (2-chloro-4-methoxy-phenyl)-3,5-dioxo-1,2,4-triazolidine. Melting point 173–175° C. (from ethanol/water).

1-phenyl - 4 - [2 - methoxy - 4 - (2-methoxy-phenoxy)-phenyl]-3,5-dioxo-1,2,4-triazolidine. Melting point 217–218° C. (from ethanol).

1-phenyl - 4 - (2,5-diethoxy-4-phenoxy-phenyl)-3,5-dioxo-1,2,4-triazolidine. Melting point 150–151° C. (from ethanol).

1-phenyl - 4 - (2,4-dimethoxy-phenyl)-3,5-dioxo-1,2,4-triazolidine. Melting point 172–174° C. (from ethanol).

1-phenyl - 4 - (2-chloro-4-hexyloxy-phenyl)-3,5-dioxo-1,2,4-triazolidine. Melting point 157–159° C. (from ethanol).

1-phenyl - 4 - [2-chloro-4-(β-hydroxy-ethoxy)-phenyl]-3,5-dioxo-1,2,4-triazolidine. Melting point 100–102° C. (from ethanol/water).

1-phenyl - 4 - [2-methoxy-5-(2,3,4-trimethyl-pentyl-2)-phenyl]-3,5-dioxo-1,2,4-triazolidine. Melting point 123–125° C. (from benzene/petroleum ether).

1-phenyl - 4 - (2-methoxy-5-ethylsulfone-phenyl)-3,5-dioxo-1,2,4-triazolidine. Melting point 212–213° C. (from ethanol).

1-phenyl - 4 - (2-chloro-5-trifluoromethyl-phenyl)-3,5- dioxo-1,2,4-triazolidine. Melting point 177–179° C. (from ethanol).

1-phenyl - 4 - (2-methyl-4-octyloxy-phenyl)-3,5-dioxo-1,2,4-triazolidine. Melting point 141–142° C. (from methanol).

1-phenyl - 4 - [2 - methyl - 4 - (m-methoxy-benzyloxy)-phenyl]-3,5-dioxo-1,2,4-triazolidine. Melting point 124–126° C. (from ethanol).

1-phenyl - 4 - (2-methoxy-5-phenoxy-phenyl)-3,5-dioxo-1,2,4-triazolidine. Melting point 183–185° C. (from ethanol).

1-phenyl - 4 - (2,4-dimethyl-5-phenoxy-phenyl)-3,5-dioxo-1,2,4-triazolidine. Melting point 131–133° C. (from ethanol).

1-phenyl - 4 - (2-methoxy-4-isopropoxy-5-methyl-phenyl)-3,5-dioxo-1,2,4-triazolidine. Melting point 203–206° C. (from ethanol).

1-phenyl - 4 - (2,5-dimethyl-4-phenoxy-phenyl)-3,5-dioxo-1,2,4-triazolidine. Melting point 219–222° C. (from ethanol).

1-phenyl - 4 - (2,5-dimethyl-4-isopropoxy-phenyl)-3,5-dioxo-1,2,4-triazolidine. Melting point 178–180° C. (from ethanol).

1-phenyl - 4 - [2 - methyl-4-(2,4,6-trimethyl-phenoxy)-phenyl]-3,5-dioxo-1,2,4-triazolidine. Melting point 230–233° C. (from ethanol).

1-phenyl - 4 - (2-methyl-4-isopropoxy-phenyl)-3,5-dioxo-1,2,4-triazolidine. Melting point 190–192° C. (from ethanol).

1-phenyl - 4 - (2,4,6-trimethyl-3-methoxy-phenyl)-3,5-dioxo-1,2,4-triazolidine. Melting point 130–132° C. (from ethanol).

1-phenyl - 4 - (2,4,6-trimethyl - 3 - isopropoxy-phenyl)-3,5-dioxo-1,2,4-triazolidine. Melting point 135–137° C. (from isopropanol).

EXAMPLE 2

*1-(2-methyl-phenyl)-4-(2,4,6-trimethyl-phenyl)-3,5-dioxo-1,2,4-triazolidine*

A solution of 2-(o-methyl-phenyl)-4-(2,4,6-trimethyl-phenyl-semicarbazide-carboxylic acid-(1)-ethyl ester obtained by heating for 3 hours to 50–60° C. 25.6 g. of o-methyl-phenyl-hydrazine-β-carboxylic acid-ethyl ester-α-carboxylic acid chloride and 27 g. of 2,4-trimethylaniline in 300 cc. of alcohol was heated to the boil for one hour after addition of 200 cc. of 1 N sodium hydroxide solution. After having cooled, the reaction solution was diluted with water, shaken with ether, suction-filtered with charcoal, and then acidified. There were obtained 25 g. of the above triazolidine which was found to melt at 160–161° C. (after recrystallization from ethylacetate/petroleum ether). The sodium salt was obtained in the form of a colorless powder by concentrating the methanolic solution which had been neutralized with the calculated quantity of sodium hydroxide solution.

When starting from 2,4-dimethylaniline instead of mesidine there was obtained in analogous manner the 1-(2-methyl-phenyl) - 4 - (2,4-dimethyl-phenyl-3,5-dioxo-1,2,4-triazolidine, melting at 135–136° C. (from ether/petroleum ether).

When starting from 2,4-dimethyl-phenylhydrazine-β-carboxylic acid-ethyl ester-α-carboxylic acid chloride and 2,4-dimethyl-aniline, there was obtained in analogous manner the 1,4-bis-(2,4-dimethyl-phenyl)-3,5-dioxo-1,2,4-triazolidine melting at 127–129° C. (from ethyl acetate/petroleum ether).

When starting from 3-methyl-phenylhydrazine-β-carboxylic acid methyl ester-α-carboxylic acid-chloride and mesidine, there was obtained in analogous manner the 1-(m-methyl-phenyl) - 4 - (2,4,6-trimethyl-phenyl)3,5-dioxo-1,2,4-triazolidine melting at 150–151° C. (from methanol).

When starting from 2-methyl-4-methoxy-phenylhydrazine-β-carboxylic acid-ethyl ester-α-carboxylic acid-chloride and mesidine, there was obtained in analogus manner the 1-(2-methyl-4-methoxy-phenyl)-4-(2,4,6-trimethyl-phenyl)-3,5-dioxo-1,2,4-triazolidine melting at 193–195° C. (from methanol).

EXAMPLE 3

*2-[1-phenyl-3,5-dioxo-1,2,4-triazolidyl-(4)]-3-methoxy-diphenylene oxide*

(a) A solution of 48.5 g. of phenylhydrazine-β-carboxylic acid-ethyl ester-α-carboxylic acid-chloride in 150 cc. of alcohol was combined with a solution of 85.2 g. of 2-amino-3-methoxy-diphenyleneoxide in 500 cc. of dimethylformamide and, after having cooled, the mixture was heated for 15 minutes on the water bath to 65–80° C. To the reaction mixture, in which the corresponding semicarbazide derivative had formed, were then added 200 cc. of 2 N-sodium hydroxide solution and the whole was heated for so long until the solution remained clear. The reaction solution was then allowed to cool, and the triazolidine derivative was precipitated by acidification with dilute hydrochloric acid. The yield was 68 g., the melting point point of the compound after recrystallization from dimethylformamide/alcohol was 278–280° C.

By dissolution of the triazolidine in methanol after addition of the calculated quantity of sodium methylate and addition of ether to the solution that was suction-filtered with charcoal, the sodium salt was obtained in the form of colorless crystals.

(b) The same triazolidine was obtained by heating equimolar quantities of 2-amino-3-methoxy-diphenylene oxide and 5-ethoxy-3-phenyl-1,3,4-oxdiazolone-(2) melting at 72° C., for five hours to 190–200° C., taking up the reaction product in aqueous/alcoholic sodium hydroxide solution, and isolating the product from the alkaline solution in the usual manner.

EXAMPLE 4

*1-phenyl-4-(2,5-dimethoxy-phenyl)-3,5-dioxo-1,2,4-triazolidine*

A solution of 2-phenyl-4-(2,5-dimethoxy-phenyl)-semicarbazide-carboxylic acid-(1)-ethyl ester, obtained by heating on the steam bath for 10 minutes 24.25 g. of phenylhydrazine-β-carboxylic acid ethyl ester-α-carboxylic acid chloride and 30.6 g. of 2,5-dimethoxy-aniline in 275 cc. of ethanol, was further heated for 30 minutes after addition of 100 cc. of 2 N-sodium hydroxide solution, then the solution was allowed to cool, charcoal was added, the whole was filtered with suction and acidified with hydrochloric acid. 30.5 g. of the above triazolidine were obtained which after recrystallization from alcohol was found to melt at 196–198° C. The sodium salt was obtained by evaporating the aqueous methanolic solution obtained upon neutralization with sodium hydroxide, and triturating the residue obtained to give a colorless powder.

EXAMPLE 5

*2-[1-(4-chloro-phenyl)-3,5-dioxo-1,2,4-triazolidyl-(4)]-3-methoxy-diphenylene oxide*

The reaction mixture obtained by heating equimolar quantities of p-chloro-phenylhydrazine-β-carboxylic acid-ethyl ester-α-carboxylic acid chloride, 2-amine-3-methoxy-diphenylene oxide and N,N-dimethylaniline in alcohol, was heated on the steam bath with an excess quantity of sodium hydroxide solution so long until the solution was clear. From this clear solution dimethylaniline separated upon dilution with water. Upon acidification with glacial acetic acid or with a mineral acid there was obtained in good yield the above triazolidine which after recrystallization from dimethylformamide/alcohol was found to melt at 268–270° C.

The sodium salt recrystallized from a mixture of ethyl acetate and methanol upon addition of ether.

With the use of 2,5-dimethoxy-4-chloro-aniline there was obtained in analogous manner the 1-(4-chloro-phenyl)-4-(2,5 - dimethoxy-4-chloro-phenyl)-3,5-dioxo - 1,2,4-triazolidine melting at 243–245° C. (from dimethylformamide/water).

EXAMPLE 6

*1-phenyl-4-(2,4-dimethyl-phenyl)-3,5-dioxo-1,2,4-triazolidine*

(a) 32.7 g. of 2-phenyl-4-(2,4-dimethyl-phenyl)-semicarbazide-carboxylic acid-((1)-ethyl ester, melting at 182–183° C., were suspended in methanol and, after addition of a sodium methylate solution prepared from 3 g. of sodium and 65 cc. of methanol, the whole was heated on the steam bath. There was obtained a solution which remained clear upon dilution with water.

By acidification of the reaction solution diluted with water, there was obtained in almost quantitative yield the 1-phenyl-4-(2,4-dimethyl-phenyl) - 3,5 - dioxo - 1,2,4 - triazolidine which after recrystallization from ethanol was found to melt at 188–189° C.

(b) The same compound was obtained when 2-phenyl-4-(2,4-dimethyl-phenyl)-semicarbazide - carboxylic acid-(1)-ethyl ester was heated on a bath having about 190° C. until the separation of alcohol was terminated and by several times recrystallizing from alcohol the reaction mixture obtained.

(c) The same compound was formed when equimolar quantities of phenylhydrazine-β-carboxylic acid-methyl ester and N-carbo-methoxy-2,4-dimethyl aniline were heated for four hours on the bath having 190–195° C. The triazolidine was separated by taking it up in aqueous methanolic sodium hydroxide solution, it was precipitated by acidification and recrystallized from alcohol.

(d) By heating, for several hours to 195–220° C., equimolar quantities of 1-phenyl-semicarbazide and (2,4-dimethyl-phenyl)-carbamic acid-methyl ester and further operating in the manner described in Example 6c, there was obtained the same triazolidine melting at 186–189° C.

(e) The same triazolidine was obtained by heating for three hours on the bath, the temperature of which was slowly raised from 100 to 190° C., phenylhydrazine-α-carboxylic acid chloride-β-carboxylic acid-methyl ester with the calculated quantity of 2,4-dimethylaniline and several times recrystallizing from alcohol the reaction mixture cooled.

(f) The same compound was obtained by heating for five hours on a bath having about 200° C., equimolar quantities of 5-ethoxy-3-phenyl-1,3,4-oxadiazolone-(2) melting at 72° C. (prepared by the action of ammonia upon phenyl-hydrazine-β-carboxylic acid-ethyl ester-α-carboxylic acid-chloride) and 2,4-dimethyl-aniline, and isolating the reaction product via the sodium salt.

(g) Equimolar quantities of 2,4-dimethyl-aniline-hydrochloride and phenylhydrazine were heated with the calculated quantity of urea for 5½ hours to 200° C. After having cooled, the reaction product was taken up in aqueous alcoholic sodium hydroxide solution, the alkaline solution was diluted with water, shaken with ether and acidified. There was obtained the same 1-phenyl-4-(2,4-dimethyl-phenyl)-3,5-dioxo-1,2,4 - triazolidine.

(h) The same compound was obtained by heating for several hours to 170–200° C., 1-phenyl-4-(2,4-dimethyl-phenyl)-semicarbazide with an excess quantity of urea and isolating the triazolidine thus formed according to the method described in Example 6c.

(i) The same triazolidine at 186–189° C. was obtained by heating 1-phenyl-3,5-dioxo-1,2,4-triazolidine for 5 hours to 200° C. with the equimolar quantity of 2,4-dimethyl-aniline, whereupon ammonia was liberated, and by further processing according to the method described in Example 6g.

EXAMPLE 7

*1-phenyl-4-(2,4,6-trimethyl-phenyl)-3,5-dioxo-1,2,4-triazolidine*

(a) A solution of 2-phenyl-4-(2,4,6-trimethyl-phenyl)-semicarbazide-carboxylic acid-(1)-methyl ester, prepared by heating on the steam bath for one half hour, 22.9 g. of phenylhydrazine-β-carboxylic acid-methylester-α-carboxylic acid-chloride and 27 g. of 2,4,6-trimethyl-aniline in 200 cc. of methanol, were heated for 30 minutes on the steam bath after addition of 50 cc. of 4 N sodium hydroxide solution. The reaction solution was diluted with water, suction-filtered with charcoal, acidified with dilute sulfuric acid; the triazolidine was obtained as crystalline product which was suction-filtered, washed with water, and dried; the yield was 27.5 g., the melting point 148–150° C. After recrystallization from ethanol, the compound was found to melt at 153–154° C.

(b) The same compound was obtained by treating an alkaline solution of 1-phenyl-4-(2,4,6-trimethyl-phenyl)-3-oxo-5-thio-1,2,4-triazolidine melting at 235–237° C. (prepared by condensation of phenylhydrazine-β-carboxylic acid-ethyl-ester-α-thiocarboxylic acid chloride with mesidine and subsequent treatment with sodium hydroxide solution) with a slight excess quantity of potassium permanganate and terminating the reaction by moderate heating. A remaining green coloration was removed by addition of some droplets of methanol, the potassium permanganate was removed by filtration with suction, the filtrate was acidified and the product was recrystallized from alcohol.

EXAMPLE 8

*1-phenyl-4-(2,4-dimethyl-phenyl)-3,5-dioxo-1,2,4-triazolidine*

10.8 g. of phenylhydrazine and 23.8 g. of 2,4-dimethyl-aniline-N,N-dicarboxylic acid-dimethyl ester, melting at 121–123° C., were heated to the boil together with 10.8 g. of sodium methylate in 200 cc. of xylene until the separation of methanol was terminated. After having cooled, the reaction product was suction-filtered, dissolved in water and treated with charcoal. Upon acidification there were obtained 6.8 g. of 1-phenyl-4-(2,4-dimethyl-phenyl)-3,5-dioxo-1,2,4-triazolidine which after recrystallization from ethanol was found to melt at 187–189° C.

We claim:

1. A compound selected from the group consisting of a compound of the formula

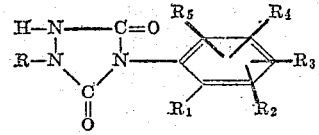

in which R is a phenyl group of the formula

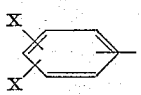

in which $X_1$ and $X_2$ are members selected from the group consisting of hydrogen, halogen, methyl and methoxy, $R_1$ is a member selected from the group consisting of halogen, alkyl having from 1 to 4 carbon atoms, alkoxy having from 1 to 4 carbon atoms, phenoxy and benzyloxy, $R_2$ is a member selected from the group consisting of halogen, alkyl having from 1 to 8 carbon atoms, alkoxy having from 1 to 8 carbon atoms, hydroxyethoxy, cycloalkyl having from 5 to 6 carbon atoms, phenyl, p-ethoxy-phenyl, benzyl, benzhydril, benzyloxy, m-methoxy-benzyloxy, phenoxy and phenylmercapto, $R_3$ is a member selected from the group consisting of hydrogen, trifluoromethyl, halogen, alkyl having from 1 to 4 carbon atoms, alkoxy having from 1 to 4 carbon atoms, halogeno alkoxy having from 1 to 4 carbon atoms, alkoxyalkoxy having from 2 to 4 carbon atoms, nitro, acetyl, methyl-sulfonyl, ethylsulfonyl and phenylsulfonyl, $R_4$ and $R_5$ are members selected from the group consisting of hydrogen, methyl, methoxy and acetyl and $R_2$ and $R_3$ are further members of a methylenedioxy and a benzofurane ring, and nontoxic physiological compatible salts thereof.

2. The 1-phenyl-4-(2-chloro-4-ethoxy-phenyl) - 3,5 - dioxo-1,2,4-triazolidine.

3. The 2-[1 - phenyl-3,5-dioxo-1,2,4-triazolidyl-(4)]-3-methoxy-diphenylene oxide.

4. The 1-phenyl-4-(2,4,6-trimethyl-phenyl)-3,5-dioxo-1,2,4-triazolidine.

5. The 1-phenyl-4-(2-methyl-4-cyclohexyl-phenyl)-3,5-dioxo-1,2,4-triazolidine.

6. The 1-phenyl-4-(2,5-dimethyl-4-phenoxy - phenyl)-3,5-dioxo-1,2,4-triazolidine.

References Cited by the Examiner
UNITED STATES PATENTS

| | | | |
|---|---|---|---|
| 2,763,590 | 9/56 | Gollaher et al. | 167—65 |
| 2,764,594 | 9/56 | Thompson et al. | 260—308 |
| 2,800,486 | 7/57 | Grundmann et al. | 260—308 |
| 2,905,693 | 9/59 | Hafliger | 260—310 |
| 2,909,465 | 10/59 | Kraft | 167—65 |
| 3,133,933 | 5/64 | Ruschig et al. | 260—308 |

FOREIGN PATENTS

| | | |
|---|---|---|
| 778,128 | 7/57 | Great Britain. |
| 806,759 | 12/58 | Great Britain. |

OTHER REFERENCES

Beilsteins Handbuch der Organischen Chemie, vol. 26 (Berlin, 1937), pages 199, 201–2, 210, 213–6, and 219.

Burger: Medicinal Chemistry (New York, 1960), pages 42–43 and 77–78.

Lowy et al.: An Introduction to Organic Chemistry (New York 1945), page 213.

Conant: The Chemistry of Organic Compounds (New York, 1947), page 342.

IRVING MARCUS, *Primary Examiner.*

D. T. McCUTCHEN, NICHOLAS S. RIZZO, WALTER A. MODANCE, *Examiners.*